(12) United States Patent
Huang et al.

(10) Patent No.: US 11,290,971 B2
(45) Date of Patent: Mar. 29, 2022

(54) SIGNAL DETECTION METHOD AND APPARATUS, SIGNAL SENDING METHOD AND APPARATUS, REMOTE USER DEVICE, AND STORAGE MEDIUM

(71) Applicant: XI'AN ZHONGXING NEW SOFTWARE CO., LTD., Shaanxi (CN)

(72) Inventors: Shuanghong Huang, Guangdong (CN); Youxiong Lu, Guangdong (CN); Jie Chen, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 54 days.

(21) Appl. No.: 16/638,183

(22) PCT Filed: May 24, 2018

(86) PCT No.: PCT/CN2018/088277
§ 371 (c)(1),
(2) Date: Feb. 11, 2020

(87) PCT Pub. No.: WO2019/029227
PCT Pub. Date: Feb. 14, 2019

(65) Prior Publication Data
US 2020/0367184 A1 Nov. 19, 2020

(30) Foreign Application Priority Data
Aug. 11, 2017 (CN) .......................... 201710686097.X

(51) Int. Cl.
*H04W 4/00* (2018.01)
*H04W 56/00* (2009.01)
(Continued)

(52) U.S. Cl.
CPC ......... *H04W 56/001* (2013.01); *H04W 8/005* (2013.01); *H04W 48/16* (2013.01);
(Continued)

(58) Field of Classification Search
CPC ... H04W 56/001; H04W 8/005; H04W 88/04; H04W 76/14; H04W 92/18; H04W 48/16
(Continued)

(56) References Cited

U.S. PATENT DOCUMENTS 9,525,538 B2 * 12/2016 Sirotkin ................. H04L 5/0062
9,526,001 B2 * 12/2016 Stojanovski .......... H04W 36/22
(Continued)

FOREIGN PATENT DOCUMENTS

CN          103686985 A         3/2014
CN          104812058 A         7/2015
(Continued)

OTHER PUBLICATIONS

Chinese Office Action and Search Report dated Jun. 17, 2021; Chinese Application No. 201710686097X.
(Continued)

*Primary Examiner* — Marceau Milord
(74) *Attorney, Agent, or Firm* — McDonald Hopkins LLC

(57) ABSTRACT

Disclosed are a signal detection method and apparatus, a signal sending method and apparatus, and a remote user equipment. The signal detection method includes: a first synchronization signal is sent based on a first timing reference; a first discovery signal is detected based on the first timing reference, where the first discovery signal carries synchronization information; after the first discovery signal is detected, a second synchronization signal is detected within a first time window corresponding to the synchronization information.

15 Claims, 7 Drawing Sheets

Detect a first synchronization signal; send a first discovery signal based on a first timing reference, where the first timing reference is obtained by detecting the first synchronization signal; the first discovery signal carries synchronization information, where the synchronization information is used by the first equipment to determine a first time window for detecting a second synchronization signal — S602

Send a second synchronization signal based on the second timing reference — S604

(51) Int. Cl.
*H04W 76/14* (2018.01)
*H04W 8/00* (2009.01)
*H04W 48/16* (2009.01)
*H04W 88/04* (2009.01)
*H04W 92/18* (2009.01)

(52) U.S. Cl.
CPC ........... *H04W 76/14* (2018.02); *H04W 88/04* (2013.01); *H04W 92/18* (2013.01)

(58) Field of Classification Search
USPC ........................................................ 370/329
See application file for complete search history.

(56) References Cited

U.S. PATENT DOCUMENTS

| | | | |
|---|---|---|---|
| 10,045,192 B2* | 8/2018 | Niu ...................... | H04L 61/6077 |
| 2012/0155648 A1* | 6/2012 | Tupala ................. | H04L 27/2656 380/287 |
| 2014/0094212 A1* | 4/2014 | Ahn ........................ | H04W 4/70 455/517 |
| 2015/0045016 A1* | 2/2015 | Xiong ..................... | H04W 4/80 455/426.1 |
| 2015/0084764 A1* | 3/2015 | Wunsche ................. | B60R 1/12 340/462 |
| 2015/0085764 A1* | 3/2015 | Xiong .................... | H04L 5/0048 370/329 |
| 2015/0215763 A1 | 7/2015 | Ro et al. | |
| 2016/0044613 A1 | 2/2016 | Cai et al. | |
| 2016/0212721 A1* | 7/2016 | Sheng ................... | H04W 76/14 |
| 2017/0005850 A1 | 1/2017 | Chae et al. | |
| 2017/0019886 A1* | 1/2017 | Patel ........................ | H04W 4/70 |
| 2017/0086114 A1 | 3/2017 | Jung et al. | |
| 2017/0142594 A1* | 5/2017 | Zhang ................. | H04W 40/248 |
| 2017/0142703 A1 | 5/2017 | Peng et al. | |
| 2017/0142741 A1* | 5/2017 | Kaur .................... | H04W 76/14 |
| 2017/0150314 A1* | 5/2017 | Hwang ..................... | G01S 5/00 |
| 2017/0150480 A1* | 5/2017 | Kim ....................... | H04W 8/005 |
| 2017/0339511 A1* | 11/2017 | Lee ....................... | H04L 5/0091 |
| 2017/0353936 A1* | 12/2017 | Zhang ................. | H04W 56/001 |
| 2018/0124707 A1* | 5/2018 | Lee .................... | H04W 72/0406 |
| 2018/0176805 A1* | 6/2018 | Lee ....................... | H04W 92/18 |
| 2018/0199388 A1* | 7/2018 | Tabet ................. | H04W 72/0446 |
| 2018/0213498 A1* | 7/2018 | Khoryaev ............ | H04B 7/2693 |
| 2018/0270776 A1* | 9/2018 | Yasukawa ......... | H04W 56/0015 |
| 2018/0343632 A1* | 11/2018 | Lee ...................... | H04L 41/0803 |
| 2019/0045468 A1* | 2/2019 | Blasco Serrano .... | H04W 76/14 |
| 2019/0098589 A1* | 3/2019 | Chae .................... | H04B 7/18582 |
| 2020/0092685 A1* | 3/2020 | Fehrenbach ......... | H04B 7/2606 |
| 2021/0160681 A1* | 5/2021 | Lee ........................ | H04L 5/0048 |

FOREIGN PATENT DOCUMENTS

| | | |
|---|---|---|
| CN | 105934900 A | 9/2016 |
| CN | 105992348 | 10/2016 |
| CN | 106575993 | 4/2017 |
| CN | 106664673 A | 5/2017 |
| CN | 106686714 | 5/2017 |
| CN | 107027166 A | 8/2017 |
| EP | 3091765 A1 | 11/2016 |
| EP | 3142458 A1 | 3/2017 |
| EP | 3358892 A1 | 8/2018 |
| WO | 2016106680 A1 | 7/2016 |
| WO | 2016185967 A1 | 11/2016 |
| WO | 2017057321 | 4/2017 |

OTHER PUBLICATIONS

Chinese Office Action dated Dec. 1, 2020; Chinese Application No. 201710686097.X.
Extended European Search Report dated Apr. 23, 2021; European Application No. 18844580.3.
Interdigital Communications: "Inter-carrier/inter-PLMN Discovery SLSS and Gaps," 3GPP Draft; R2-156708 Inter-PLMN Sync, CRD Generation Partnership Project (3GPP), XP051040406, (Nov. 16, 2015).
Huawei et al.: "Discussion on UE synchronization behaviour and time-frequency offset," 3GPP Draft; R4-152579 Discussion N UE Synchronization Behaviour and Time-Frequency Offset, 3rd Generation Partnership Project (3GPP), XP050974821, (May 24, 2015).
3GPP TSG RAN WG120160219, Meeting #84 R1-161014.
3GPP TSG RAN WG120170825, Meeting #90 R1-1712915.
Chinese Search Report, Application No. 201710686097.X.
Patent Cooperation Treaty (PCT), International Search Report and Written Opinion for Application PCT/CN2018/088277 filed on May 24, 2018, dated Aug. 2, 2018, International Searching Authority, CN.

* cited by examiner

SIGNAL DETECTION METHOD AND APPARATUS, SIGNAL SENDING METHOD AND APPARATUS, REMOTE USER DEVICE, AND STORAGE MEDIUM

CROSS-REFERENCE TO RELATED APPLICATION

The present application is a 35 U.S.C. 371 national stage filing of PCT Application No. PCT/CN2018/088277 filed on May 24, 2018, which claims priority to Chinese patent application No. CN201710686097.X filed on Aug. 11, 2017, the disclosure of which are incorporated herein by reference in their entirety.

TECHNICAL FIELD

The present disclosure relates to the field of communications, and in particular, to a signal detection method and apparatus, a signal sending method and apparatus, a remote user equipment, and a storage medium.

BACKGROUND

In a device-to-device (D2D) communication, traffic data is transmitted directly from a source user equipment to a target user equipment through an air interface without being forwarded by a base station and a core network. FIG. 1 is a schematic diagram of a architecture of a communication mode of the D2D communication in the related art, as shown in FIG. 1, this communication mode may also be referred to as a proximity service (ProSe). For a user to perform short-distance communication, the radio spectrum resource is saved and the data transmission pressure of the core network is reduced through the D2D communication.

In the D2D communication, a receiving end user equipment (UE) needs to be in timing synchronization with a sending end user equipment so as to ensure that the receiving end UE may correctly parse data sent by the sending end UE.

In the related D2D technology, a UE obtains a synchronization timing reference by detecting a sidelink synchronisation signal (SLSS), thereby achieving a timing synchronization with neighboring UEs.

In the D2D technology, UEs participating in the D2D communication include a relay UE and a remote UE. The remote UE may be within a network coverage, or may be out of the network coverage and communicate with a cellular network through relay of the Relay UE. FIG. 2 is a schematic diagram of a architecture of the D2D technology in the related art, as shown in FIG. 2. Among them, the remote UEs include an internet of things (IoT) device and a wearable device. For these devices, low power consumption is a key requirement needs to be considered.

According to a technical solution in the related art, when the remote UE out of the coverage has communication requirements, if no SLSS is detected, the remote UE sends a SLSS based on its own timing so that other D2D UEs obtain a timing for receiving data sent by the remote UE. The SLSS is periodically sent and the processing of detecting the SLSS is still carried out at the same time, until the SLSS sent by a high-priority synchronization reference source is detected. Then, the remote UE is synchronization with the synchronization reference source.

In the above-mentioned synchronization process, for the remote UE, the continuous detection of the SLSS is apparently not conducive to saving the power consumption of the device, so there is a problem of high power consumption.

SUMMARY

Embodiments of the present disclosure provide a signal detection method and apparatus, a signal sending method and apparatus, and a remote user equipment.

According to an embodiment of the present disclosure, provided is a signal detection method applied to a first user equipment. In the method, a first synchronization signal is sent based on a first timing reference; a first discovery signal is detected based on the first timing reference; where the first discovery signal carries synchronization information; and after the first discovery signal is detected, a second synchronization signal is detected within a first time window corresponding to the synchronization information.

According to an embodiment of the present disclosure, provided is a signal sending method applied to a second user equipment. In the method, a first synchronization signal is detected; a first discovery signal is sent based on a first timing reference, where the first timing reference is a timing reference obtained by detecting the first synchronization signal; the first discovery signal carries synchronization information, where the synchronization information is used by a first user equipment to determine a first time window used for detecting a second synchronization signal; and the second synchronization signal is sent based on a second timing reference.

According to an embodiment of the present disclosure, provided is a signal detection apparatus located in a first user equipment. The signal detection apparatus includes a first sending module, a first detection module and a second detection module. The first sending module is configured to send a first synchronization signal based on a first timing reference. The first detection module is configured to detect a first discovery signal based on the first timing reference, where the first discovery signal carries synchronization information. The second detection module is configured to detect a second synchronization signal within a first time window corresponding to the synchronization information after the first discovery signal is detected.

According to an embodiment of the present disclosure, provided is a signal sending apparatus, including a detection module, a first sending module and a second sending module. The detection module is configured to detect a first synchronization signal. The first sending module is configured to send a first discovery signal based on a first timing reference, where the first timing reference is a timing reference obtained by detecting the first synchronization signal, the first discovery signal carries synchronization information, the synchronization information is used by a first user equipment to determine a first time window used for detecting a second synchronization signal. The second sending module is configured to send the second synchronization signal based on a second timing reference.

According to an embodiment of the present disclosure, provided is a remote user equipment including a processor. The processor is configured to execute a program. The program is executed to perform the method of any one of the above.

According to an embodiment of the present disclosure, provided is a relay user equipment including a processor. The processor is configured to execute a program. The program is executed to perform the method of any one of the above.

According to an embodiment of the present disclosure, provided is a storage medium storing a program. The program is executed to perform the method of any one of the above.

According to an embodiment of the present disclosure, provided is a processor. The processor is configured to execute a program. The program is executed to perform the method of any one of the above.

According the embodiments of the present disclosure, after the first discovery signal is detected, the second synchronization signal may be detected within the first time window corresponding to the synchronization information carried by the first discovery signal, that is, instead of being continuously monitored all the time, the second synchronization signal may be detected only within the first time window, such that the time, the times and the like for detecting the synchronization signal by the device may be reduced, and thus the power consumption generated by detecting the synchronization signal by the device may be reduced. Therefore, the problem in the related art that the power consumption of the remote user equipment is large because that the remote user equipment continuously detects the synchronous signal may be solved, the effect of reducing the power consumption of the device is achieved, the standby time of the device may be prolonged for the mobile device, which is beneficial to achieve the ultra-long standby.

BRIEF DESCRIPTION OF DRAWINGS

The drawings described herein are used to provide a further understanding of the present disclosure and constitute a part of the present application. The schematic embodiments of the present disclosure and the descriptions thereof are used to explain the present disclosure, and do not constitute an improper limitation on the present disclosure. In the drawings.

DETAILED DESCRIPTION

Hereinafter, the present disclosure will be described in detail with reference to the accompanying drawings and in conjunction with embodiments hereinafter. It should be noted that, in a case of no conflict, embodiments in the present application and features in the embodiments may be combined with each other.

It should be noted that the terms "first" and "second" and the like in the Description and claims and the above drawings of the present disclosure are used to distinguish similar objects, and are not necessarily used to describe a specific order or sequence.

Figure 1:
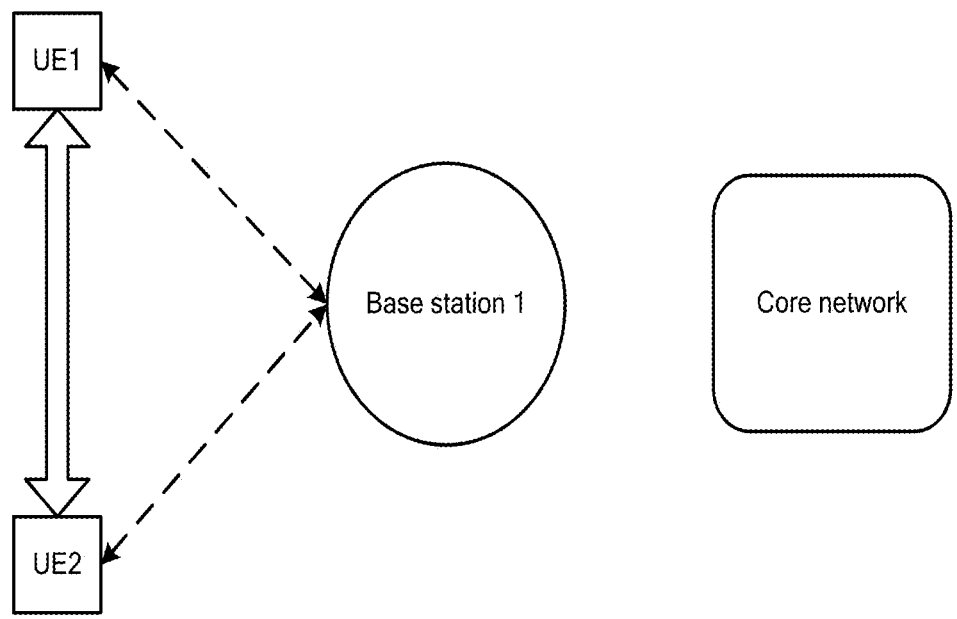
FIG. 1 is a schematic diagram of an architecture of a communication mode of a D2D technology in the related art.
Figure 2:
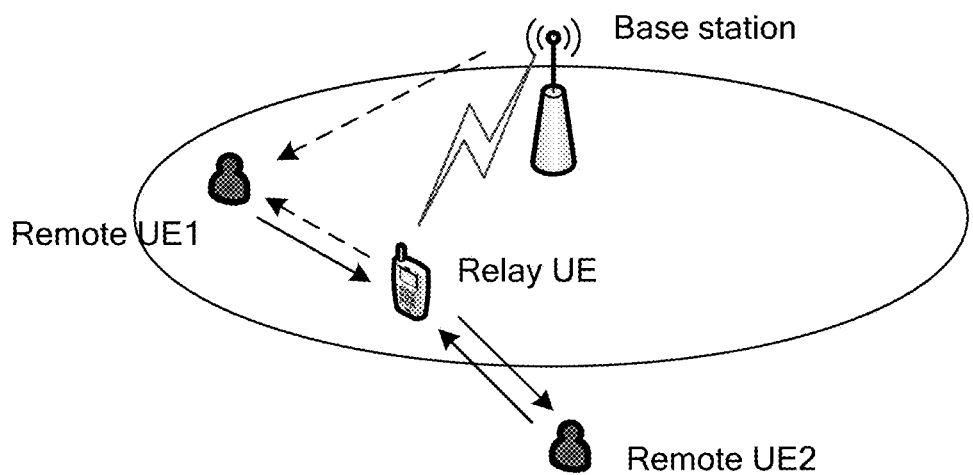
FIG. 2 is a schematic diagram of an architecture of an enhanced D2D technology in the related art.
Figure 3:
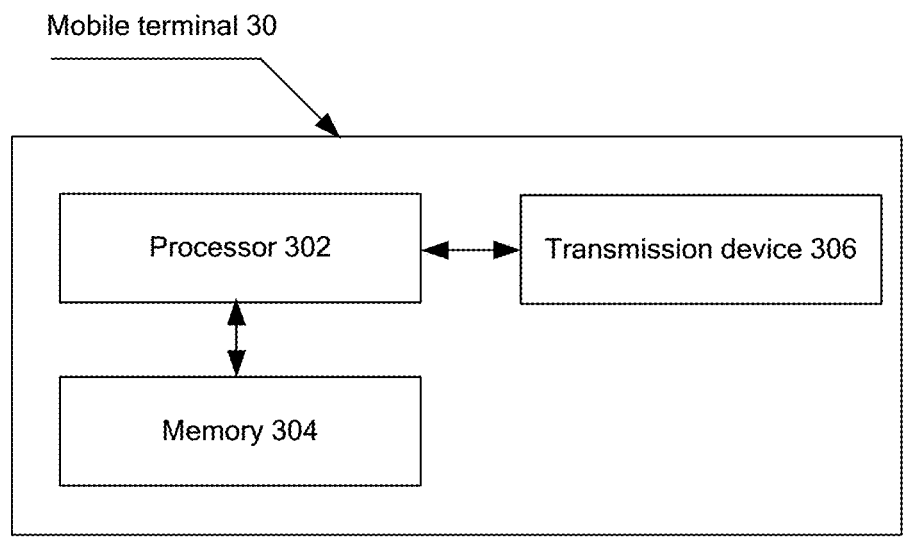
FIG. 3 is a block diagram of a hardware structure of a mobile terminal for a signal detection method of an embodiment of the present disclosure.

The method embodiments provided in the embodiments of the present application may be executed in a mobile terminal, a computer terminal, or a similar computing apparatus. A block diagram of a hardware structure of a mobile terminal or a base station for a signal detection method of an embodiment of the present disclosure is shown in FIG. 3. In FIG. 3, a mobile terminal is taken as an example, but the hardware structure of a processor, a memory, and a transmission apparatus is not limited to the mobile terminal. For example, the mobile terminal 30 may include one or more (only one shown in the drawings) processors 302 (the processor 302 may include but is not limited to a processing apparatus such as a microprocessor MCU or a programmable logic device FPGA, etc.), a memory 304 used for storing data, and a transmission device 306 used for communication. It is to be understood by those of ordinary skill in the art that the structure shown in FIG. 3 is only schematic and does not limit the structure of the above-mentioned electronic apparatus. For example, the mobile terminal 30 may further include more or less assemblies than those shown in FIG. 3 or have a different configuration from that shown in FIG. 3.

The memory 304 may be configured to store software programs and modules of an application software, such as program instructions/modules corresponding to the signal detection method in the embodiment of the present disclosure. The processor 302 is configured to execute the software programs and modules stored in the memory 304 so as to perform a variety of functional applications and data processing, that is, execute the method described above. The memory 304 may include a high-speed random access memory, and may further include a non-volatile memory, such as one or more magnetic storage devices, a flash memory, or other non-volatile solid-state memory. In some instances, the memory 304 may further include a memory remotely arranged with respect to the processor 302, and these remote memories may be connected to the mobile terminal 30 through a network. Instances of the above network include, but are not limited to, an Internet, an intranet, a local area network, a mobile communication network, and combinations thereof.

The transmission device 306 is configured to receive or send data via a network. A specific instance of the above network may include a radio network provided by a communication provider of the mobile terminal 30. In an instance, the transmission device 306 includes a network interface controller (NIC), which may be connected to other network device through the base station so as to communicate with the Internet. In an instance, the transmission device 306 may be a radio frequency (RF) module, which is used to communicate with the Internet in a wireless manner.

The mobile device may be a remote UE and/or a relay UE.

Figure 4:
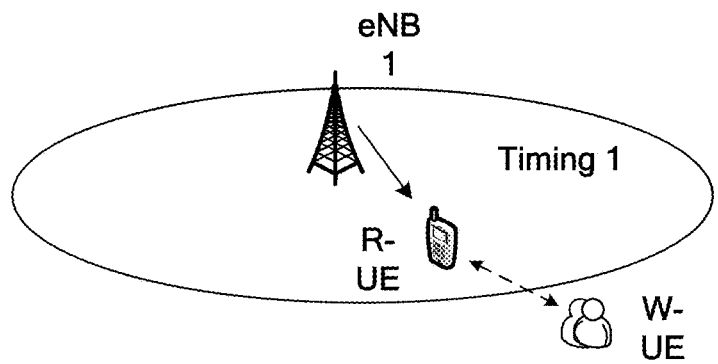
FIG. 4 is a schematic architecture diagram of a network architecture provided according to an embodiment of the present disclosure.

The embodiment of the present application may operate on a network architecture shown in FIG. 4. As shown in FIG. 4, the network architecture includes a base station (eNB1), a remote user terminal (W-UE), and a relay user terminal (R-UE).

Figure 5:
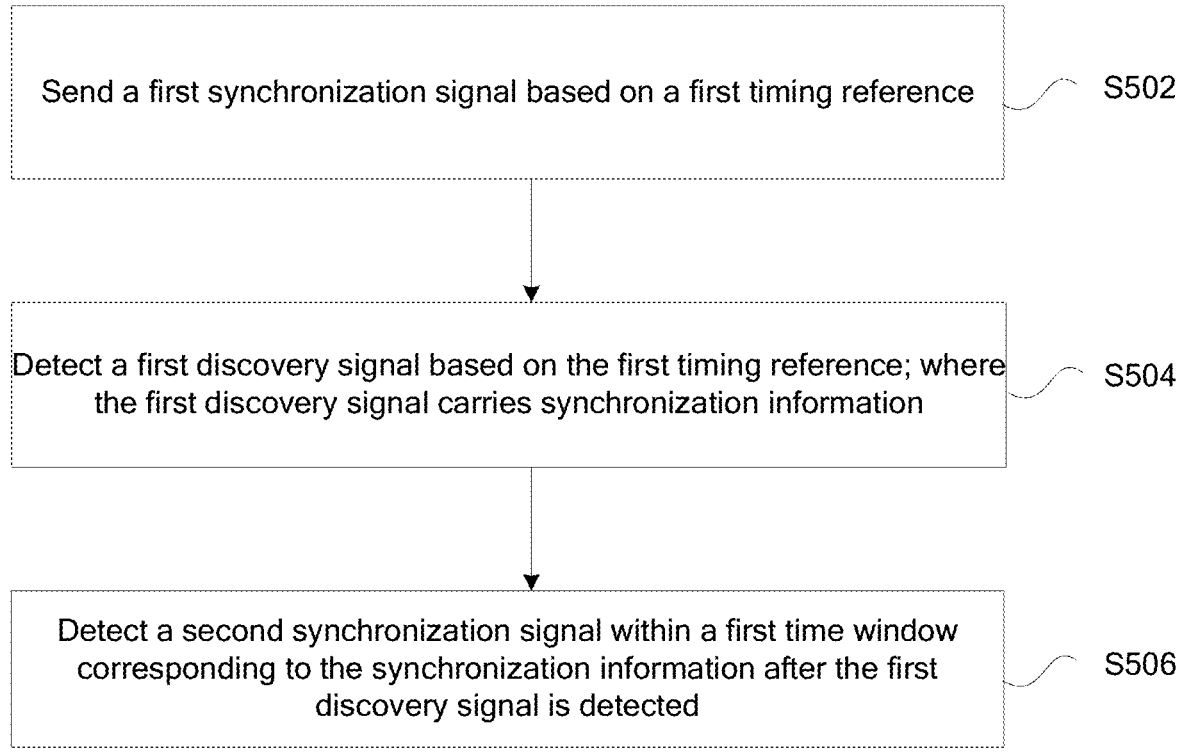
FIG. 5 is a flowchart of a signal detection method according to an embodiment of the present disclosure.

In this embodiment, a signal detection method operating on the above-mentioned network architecture or the above-mentioned terminal is provided. The method is applied to a first user equipment. FIG. 5 is a flowchart of a signal detection method according to an embodiment of the present disclosure. As shown in FIG. 5, this process includes steps described below.

In step S502, a first synchronization signal is sent based on a first timing reference.

In step S504, a first discovery signal is detected based on the first timing reference; where the first discovery signal carries synchronization information.

In step S506, after the first discovery signal is detected, a second synchronization signal is detected within a first time window corresponding to the synchronization information.

In some embodiments, the first timing reference may be pre-configured in a device such as a UE, or may also be received from a network-side device, for example, a base station on a network side broadcasts the first timing reference. The first timing reference may be a time preset in a time domain and specifically used for sending the first synchronization signal, for example, the first timing reference may be a time pattern for sending a first reference signal by the base station, and thus, the first timing reference may be determined according to this time pattern. The time pattern may include a time period or a preset periodic or aperiodic timing information. The base station may broadcast or multicast the first timing reference in a cell covered by the base station. For example, after the UE enters a cell, the first timing reference may be obtained from a system message, or the first timing reference may be obtained from a message relayed by a relay user equipment.

In this embodiment, the first timing reference provides a reference time period for sending the first synchronization signal and detecting the first discovery signal. A sending time period of the first synchronization signal and a detecting time period of the first discovery signal may be in one-to-one correspondence with each other. For example, if the first synchronization signal is sent in the $n_{th}$ sending time period of the first synchronization signal according to the time pattern, the first discovery signal may be detected in the $n_{th}$ detection time period of the first discovery signal. In this way, the sending time period and the detection time period corresponding to the first synchronization signal and the first discovery signal are set in one-to-one correspondence with each other, which facilitates the UE to send the synchronization signal and detect the discovery signal, and has a characteristics of simple and convenient implementation. The sending time period and the detection time period may be any duration, for example, 1 second or 2 seconds or 5 ms, and may be one or more transmission symbols, etc.

In other embodiments, the first timing reference sets a sending time period of the first synchronization signal as well as an offset and a preset detection duration for determining the first discovery signal, for example, a start time of the detection of the first discovery signal is deferred by the offset in the time domain after the first synchronization signal is sent, and the detection of the first discovery signal is stopped after an actual detection duration reaches the preset detection duration. If the first discovery signal is detected, it may be considered that a D2D discovery is successfully achieved. The D2D communication synchronization is achieved through the synchronization information in the first discovery signal.

In some embodiments, the first timing reference may be some discrete time points or time periods in the time domain.

Of course, the above are merely some examples of the transmission of the first synchronization signal and the first discovery signal based on the first timing reference. The specific implementation is various, and is not limited to any one of the above.

Through the above-mentioned steps, the first discovery signal may be sent by other D2D devices based on the first synchronization signal sent by the current device. For example, device A sends the first synchronization signal to discover other devices, and device B sends the first discovery signal upon detecting the first synchronization signal, and the first discovery signal carries the synchronization information. The synchronization information may include a synchronization command for instructing a first time window to send and/or detect the second synchronization signal. In this case, the first time window may be preset or stored in the UE.

The synchronization information may also directly carry parameter of the first time window, for example, information such as a duration, a start and stop time, and an offset of the time window, etc. The second synchronization signal is detected within the first time window corresponding to the synchronization information carried by the first discovery signal after the first discovery signal is detected, that is, the second synchronization signal is only detected within the first time window, and thus the power consumption of the device may be reduced. Therefore, the problem in the related art that the power consumption of the remote user equipment is large due to a continuous detection of the synchronous signal may be solved, thereby reducing the power consumption of the device.

On one hand, in the embodiment of the present disclosure, it is not necessary to detect the synchronization signal at all times. After the first synchronization signal is sent by the first timing reference, the first discovery signal is detected to determine the first time window for detecting the synchronization signal, and the second synchronization signal is only detected within the first time window, thereby reducing the duration for detecting the synchronization signal and further reducing the power consumption of detecting the synchronization signal. On the other hand, the first discovery signal is detected based on the first timing reference rather than being detected at all times, such that the detection during of the discovery signal itself is also shortened, and the power consumption of detecting the discovery signal is also reduced. On still another hand, the detection of the discovery signal and the detection of the synchronization signal are no longer performed independently and in parallel without any correlation. Compared with the related art where both the discovery signal and the synchronization signal are detected continuously, the UE detects the second synchronization signal only within the first time window after the first discovery signal carrying the synchronization information is detected, which greatly reduces unnecessary power consumption caused by a blind detection, on the one hand, the D2D discovery is achieved through the detection of the discovery signal, and on the other hand, communication synchronization between D2D devices is achieved through defining the detection of the synchronization signal within the time window, more importantly, unnecessary detection is greatly reduced, power consumption is reduced, and standby time of the mobile device is prolonged.

It should be noted that the above-mentioned first synchronization signal includes at least one of a first sidelink synchronization signal (SLSS) and a first physical sidelink broadcast channel (PSBCH); and the second synchronization signal includes at least one of a second SLSS or a second PSBCH.

It should be noted that the synchronization information may include an offset between the first timing reference and a second timing reference, or the synchronization information includes the offset between the first timing reference and the second timing reference and a parameter of the first time window. The second timing reference is a timing reference for a second user equipment to send the second synchronization signal.

It should be noted that in the case where the synchronization information includes the offset between the first timing reference and the second timing reference described above, the parameter of the first time window described above may be obtained in a predefined manner or according to a configuration signaling or other methods, instead of being carried in the synchronization information.

In an embodiment of the present disclosure, in the case where the synchronization information includes the offset between the first timing reference and the second timing reference, the above step S506 may be represented as: the first time window is determined according to the synchronization information and a parameter of the first time window based on the first timing reference; and the second synchronization signal is detected within the determined first time window.

In the case where the synchronization information includes the offset between the first timing reference and the second timing reference and the parameter of the first time window, the above step S506 may be represented as: the first time window is determined according to the synchronization information based on the first timing reference; and the second synchronization signal is detected within the determined first time window.

It should be noted that the above offset may be used to determine a position of the first time window, and the parameter of the first time window may be a size (a window length) of the time window above, but is not limited thereto. The window length herein is a length of the time window in the time domain, i.e., a duration.

In an embodiment of the present disclosure, before step S504, the method may further include: a second discovery signal is sent based on the first timing reference, where the second discovery signal carries at least one of: recognition information of the first user equipment for instructing that the first user equipment has a requirement to discover a relay user equipment; time delay information for sending the first discovery signal by the second user equipment; time window information for sending the first discovery signal by the second user equipment, and resource position information for sending the first discovery signal by the second user equipment.

In an embodiment of the present disclosure, step S504 may be represented as at least one of: in the case where the second discovery signal carries the time delay information for sending the first discovery signal by the second user equipment, the first discovery signal is detected within a time delay corresponding to the time delay information carried by the second discovery signal based on the first timing reference; in the case where the second discovery signal carries the time window information for sending the first discovery signal by the second user equipment, the first discovery signal is detected within a time window corresponding to the time window information carried by the second discovery signal based on the first timing reference; in the case where the second discovery signal carries the resource position information for sending the first discovery signal by the second user equipment, the first discovery signal is detected at a resource position corresponding to the resource position information carried by the second discovery signal based on the first timing reference.

It should be noted that the first user equipment may be a remote user equipment shown in FIG. 4, and the second user equipment may be the relay user equipment shown in FIG. 4, but is not limited thereto.

Optionally, an execution body of the above steps may be a terminal, such as the terminal shown in FIG. 3 and the remote user equipment shown in FIG. 4, etc., but is not limited thereto.

It should be noted that the above method may be applied to a scenario where the second user equipment is out of the coverage of the base station of the first user equipment in an enhanced D2D, but is not limited thereto.

Through the description of the above embodiments, those skilled in the art may clearly understand that the method according to the above embodiments may be implemented by means of software plus a necessary universal hardware platform. Of course, it may also be implemented by hardware, but in many cases the former is a better implementation. Based on such understanding, the technical solutions of the present disclosure, either essentially or in terms of contributions to the related art, may be embodied in the form of a software product. The computer software product is stored in a storage medium, (such as a ROM/RAM, a magnetic disk, an optical disc) and includes several instructions for causing a terminal device (which may be a mobile phone, a computer, a server, or a network device, etc.) to perform the methods described in the embodiments of the present disclosure.

Figure 6:
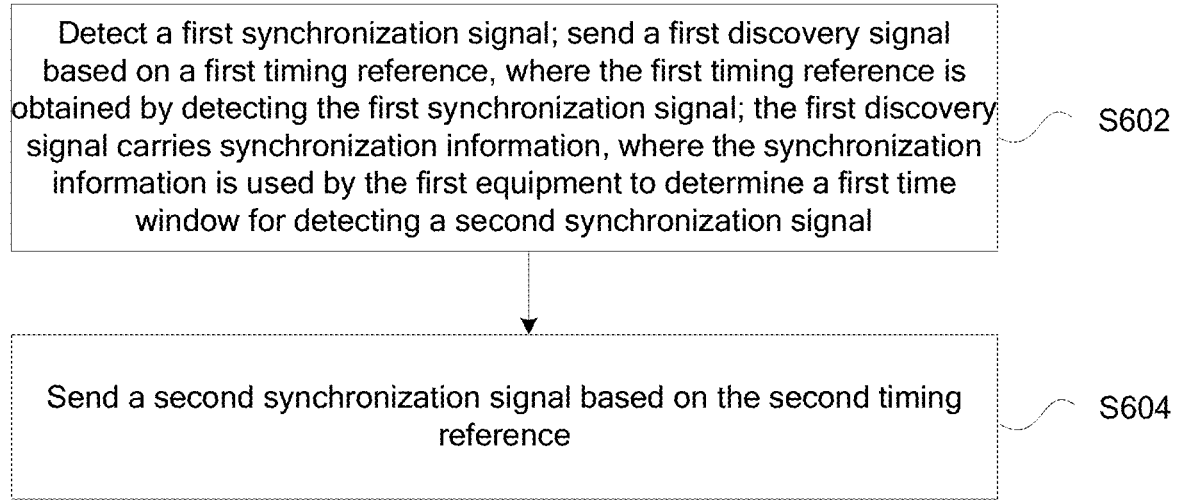
FIG. 6 is a flowchart of a signal sending method provided according to an embodiment of the present disclosure.

An embodiment of the present disclosure further provides a signal sending method operating on the network architecture shown in FIG. 4. FIG. 6 is a flowchart of a signal sending method provided according to an embodiment of the present disclosure. As shown in FIG. 6, the method may be applied to a second user equipment and include steps described below.

In step S602, a first synchronization signal is detected; a first discovery signal is sent based on a first timing reference, where the first timing reference is a timing reference obtained by detecting the first synchronization signal; the first discovery signal carries synchronization information, where the synchronization information is used by a first user equipment to determine a first time window for detecting a second synchronization signal.

In step S604, the second synchronization signal is sent based on a second timing reference.

With the above steps, the synchronization information used by the first user equipment to determine the time window for detecting the second synchronization signal is sent to the first user equipment through the first discovery signal, such that the first user equipment may detect the second synchronization signal within the determined time window, and thus a power consumption of the first user equipment may further be reduced. Therefore, the problem in the related art that the power consumption of the remote user equipment is large caused by continuously detecting the synchronous signal may be solved, thereby reducing the power consumption of the first user equipment.

It should be noted that the first synchronization signal may include at least one of a first sidelink synchronization signal (SLSS) and a first physical sidelink broadcast channel (PSBCH); the second synchronization signal includes at least one of a second SLSS and a second PSBCH.

It should be noted that the synchronization information may include an offset between the first timing reference and the second timing reference, or the synchronization information includes the offset between the first timing reference and the second timing reference and a parameter of the first time window.

In an embodiment of the present disclosure, after the above step S602, the above method may further include: a second discovery signal is received based on the first timing reference, where the second discovery signal carries at least one of: recognition information of the first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

In an embodiment of the present disclosure, in a case where the second discovery signal carries the recognition information of the first user equipment, after the second discovery signal is received, the above method may further include the following step: the first user equipment is determined as a remote user equipment having a requirement to discover the relay user equipment according to the recognition information.

It should be noted that, in a case where the second discovery signal carries at least one of the time delay information, the time window information or the resource information, after the second discovery signal is received, the above method may further include at least one of the following steps: a time delay for sending the first discovery signal is determined according to the time delay information, and the first discovery signal is sent within the determined time delay; a time window for sending the first discovery signal is determined according to the time window information, and the first discovery signal is sent within the determined time window for sending the first discovery signal; or a resource for sending the first discovery signal is determined according to the resource information, and the first discovery signal is sent on the determined resource.

It should be noted that the above first user equipment may be the remote user equipment, and the above second user equipment may be the relay user equipment, but is not limited thereto.

It should be noted that an execution body of the above steps may be the relay user equipment, but is not limited thereto.

It should be noted that the above method may be applied to a scenario in the enhanced D2D communication where the first user equipment is out of the coverage of a base station of the second user equipment, but is not limited thereto.

Through the description of the above embodiments, those skilled in the art may clearly understand that the method according to the above embodiments may be implemented by means of a software plus a necessary universal hardware platform. Of course, this method may also be implemented by means of a hardware, but in many cases the former is a better implementation. Based on such understanding, the technical solutions of the present disclosure, either essentially or in terms of contributions to the related art, may be embodied in the form of a software product, this computer software product is stored in a storage medium (such as a ROM/RAM, a magnetic disk, an optical disc) and includes several instructions for enabling a terminal device (which may be a mobile phone, a computer, a server, or a network device, etc.) to execute the methods described in the embodiments of the present disclosure.

In this embodiment, a signal detection apparatus is also provided. The apparatus is used for implementing the foregoing embodiments and preferred implementation, which are not described herein again. As used below, the term "module" may implement a combination of software and/or hardware having a predetermined function. Although the apparatus described in the following embodiments are preferably implemented in software, implementation in hardware, or a combination of software and hardware is also possible and conceived.

Figure 7:
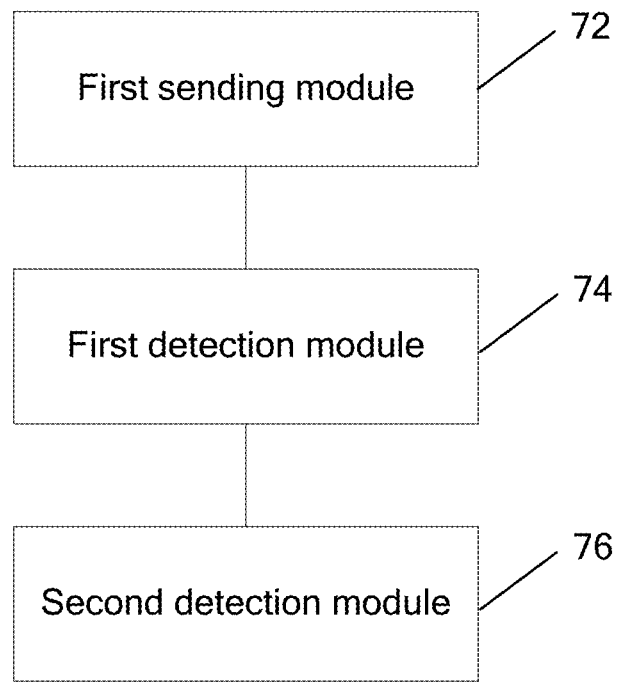
FIG. 7 is a structural block diagram of a signal detection apparatus according to an embodiment of the present disclosure.

FIG. 7 is a structural block diagram of a signal detection apparatus according to an embodiment of the present disclosure. The signal detection apparatus is located in a first user equipment. As shown in FIG. 7, the signal detection apparatus includes a first sending module 72, a first detection module 74 and a second detection module 76. The first sending module 72 is configured to send a first synchronization signal based on a first timing reference. The first detection module 74 is configured to detect a first discovery signal based on the first timing reference, where the first discovery signal carries synchronization information. The second detection module 76 is configured to detect a second synchronization signal within a first time window corresponding to the synchronization information after the first discovery signal is detected.

With the above apparatus, the second synchronization signal is detected within the first time window corresponding to the synchronization information carried by the first discovery signal after the first discovery signal is detected, that is, the second synchronization signal is detected only within the first time window, thus the power consumption of the user equipment may be reduced. Therefore, the problem in the related art that the power consumption of the remote user equipment is large because the remote user equipment continuously detects the synchronous signal may be solved, thereby achieving reducing the power consumption of the user equipment.

It should be noted that the first synchronization signal includes at least one of a first sidelink synchronization signal or a first physical sidelink broadcast channel; the second synchronization signal includes at least one of a second SLSS or a second PSBCH.

It should be noted that the synchronization information may include an offset between the first timing reference and a second timing reference, or the synchronization information includes an offset between the first timing reference and a second timing reference as well as a parameter of a first time window; where the second timing reference is a timing reference for a second user equipment to send the second synchronization signal. The second detection module 76 may further include a determination unit and a detection unit. The determination unit is configured to determine the first time window according to the synchronization information and the parameter of the first time window based on the first time reference in a case where the synchronization information includes the offset between the first time reference and the second time reference; or is configured to determine the first time window according to the synchronization information based on the first time reference in a case where the synchronization information includes the offset between the first time reference and the second time reference as well as the parameter of the first time window. The detection unit is connected to the determination unit and is configured to detect the second synchronization signal within the determined first time window.

It should be noted that the offset may be used for determining a position of the first time window, and the parameter of the first time window may be a size (window length) of the time window, but is not limited thereto. The offset herein may be an offset from a certain time reference point in the time axis. This time reference point may be a current time, a time point when a reference signal is received, or a sending time point when the reference signal is sent. Of course, this is only an example of the time reference point, and the specific implementation is not limited to any one of the above. For example, in some embodiments, the time reference point may be a preset time point.

In an embodiment of the present disclosure, the signal detection apparatus may further include a second sending module. The second sending module is connected to the first detection module 74, and configured to send a second discovery signal based on the first timing reference, where the second discovery signal carries at least one of the following information: recognition information of a first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

It should be noted that the first user equipment may be the remote user equipment shown in FIG. 4, and the second user equipment may be the relay user equipment shown in FIG. 4, but is not limited thereto.

Optionally, the signal detection apparatus may be located in the first user equipment, such as the terminal shown in FIG. 3 and the remote user equipment shown in FIG. 4, but is not limited thereto.

In this embodiment of the present disclosure, a remote user equipment is further provided. The remote user equipment includes a processor, the processor is configured to execute a program, to perform the method of the above embodiments.

In some embodiments, the remote user equipment may further include a memory connected to the processor through an integrated circuit bus, etc. The memory is configured to store information such as a program executable by the processor.

In still other embodiments, the remote user equipment may further include a transceiver. The transceiver may include an antenna capable of transmitting and receiving a radio signal, etc. The transceiver is connected to the processor such that the transmission and reception of a radio signal may be achieved under the control of the processor.

The processor may be various electronic devices or electronic circuits with information processing functions, such as a central processing unit, a microprocessor, a digital signal processor, a programmable array, and an application-specific integrated circuit, etc.

It should be noted that each of the above modules may be implemented by software or hardware. For the hardware, it may be implemented by the following manner, but is not limited thereto: the above modules are all located in the same processor; or the above modules are respectively located in a different processor in an arbitrary combination.

A signal sending apparatus is further provided in this embodiment. The signal sending apparatus is used for implementing the foregoing embodiments and preferred implementation, which are not described herein again. As used below, the term "module" may implement a combination of software and/or hardware having a predetermined function. Although the apparatus described in the following embodiments are preferably implemented in software, implementation in hardware, or a combination of software and hardware is also possible and conceived.

Figure 8:
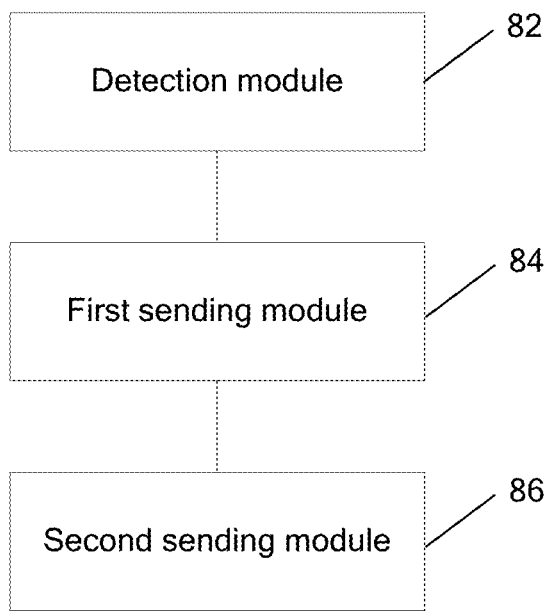
FIG. 8 is a structural block diagram of a signal sending apparatus according to an embodiment of the present disclosure.

FIG. 8 is a structural block diagram of a signal sending apparatus according to an embodiment of the present disclosure. As shown in FIG. 8, the signal sending apparatus includes a detection module 82, a first sending module 84 and a second sending module 86. The detection module 82 is configured to detect a first synchronization signal. The first sending module 84 is connected to the detection module 82, and configured to send a first discovery signal based on a first timing reference, where the first timing reference is a timing reference obtained by detecting the first synchronization signal, the first discovery signal carries synchronization information, where the synchronization information is used by the first user equipment to determine a first time window for detecting a second synchronization signal. The second sending module 86 is connected to the first sending module 84, and is configured to send the second synchronization signal based on a second timing reference.

With the signal sending apparatus, the synchronization information used by the first user equipment to determine the time window for detecting the second synchronization signal may be sent to the first user equipment through the first discovery signal, such that the first user equipment may detect the second synchronization signal within the determined time window, and thus a power consumption of the first user equipment may further be reduced. Therefore, the problem in the related art that the power consumption of the remote equipment is large because that the remote user equipment continuously detects the synchronous signal may be solved, thereby reducing the power consumption of the first user equipment.

It should be noted that the first synchronization signal may include at least one of a first sidelink synchronization signal (SLSS) or a first physical sidelink broadcast channel (PSBCH); the second synchronization signal includes at least one of a second SLSS or a second PSBCH.

It should be noted that the synchronization information may include an offset between the first timing reference and the second timing reference. Alternatively, the synchronization information may include an offset between the first timing reference and the second timing reference as well as a parameter of the time window.

It should be noted that the offset may be used for determining a position of the first time window, and the parameter of the time window may be a size (a window length) of the time window, but is not limited thereto.

In an embodiment of the present disclosure, the signal sending apparatus may further include a receiving module. The receiving module is connected to the detection module 82, and configured to receive a second discovery signal based on the first timing reference, where the second discovery signal carries at least one of the following information: recognition information of a first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

In an embodiment of the present disclosure, in a case where the second discovery signal carries the recognition information of the first user equipment, the signal sending apparatus further includes a determining module. The determining module is connected to the receiving module, and configured to determine the first user equipment as a remote user equipment having a requirement to discover the relay user equipment according to the recognition information.

It should be noted that, in a case where the second discovery signal carries at least one of the time delay information, the time window information or the resource information, the first sending module 84 is further configured to perform at least one of the following operations: determining a time delay for sending the first discovery signal according to the time delay information, and sending the first discovery signal within the determined time delay; determining a time window for sending the first discovery signal according to the time window information, and sending the first discovery signal within the determined time window for sending the first discovery signal; or determining a resource for sending the first discovery signal according to the resource information, and sending the first discovery signal on the determined resource.

It should be noted that the foregoing apparatus may be located in the relay user equipment, but is not limited thereto.

An embodiment of the present disclosure further provides a relay user equipment including a processor. The processor is configured to execute a program to perform the method of the foregoing embodiment.

In some embodiments, the relay user equipment may further include a memory. The memory is connected to the processor through an integrated circuit bus, etc., and configured to store information such as a program executable by the processor.

In still other embodiments, the relay user equipment may further include a transceiver. The transceiver may include an antenna capable of transmitting and receiving a radio signal, etc. The transceiver is connected to the processor, such that the transmission and reception of the radio signal may be achieved under the control of the processor.

The processor may be various electronic devices or electronic circuits with information processing functions, such as a central processing unit, a microprocessor, a digital signal processor, a programmable array, and an application-specific integrated circuit, etc.

An embodiment of the present disclosure further provides a storage medium, the storage medium includes a stored program, where the program above is executed to perform the method described in any one of the foregoing.

Optionally, in this embodiment, the foregoing storage medium may include, but is not limited to, a variety of media that may store a program code, such as a U disk, a read-only memory (ROM), a random access memory (RAM), a mobile hard disk, a magnetic disk, or an optical disk. The storage medium may be selected as a non-transitory storage medium.

An embodiment of the present disclosure further provides a processor, which is configured to execute a program that when executed by the processor causes the processor to perform the steps in any one of the foregoing methods.

Optionally, for specific examples in this embodiment, reference may be made to the examples described in the above embodiments and optional implementations, and details of this embodiment are not described herein again.

In order to better understand the embodiments of the present disclosure, the present disclosure is further explained in conjunction with the preferred embodiment below.

The embodiments of the present disclosure are applicable to the case that a Remote UE (referred to as W-UE) synchronizes to a Relay UE (referred to as R-UE) in a D2D communication, as shown in FIG. 4.

The present embodiment is based on the scenario shown in FIG. 4. It should be noted that, in the present embodiment, it is assumed that, instead of continuously sending the SLSS/PSBCH in any condition, the Relay UE (referred to as R-UE) sends the SLSS/PSBCH in the following condition: the base station instructs the R-UE to send (or stops sending) the SLSS/PSBCH; or a threshold for sending a RSRP is met (the RSRP is less than the threshold). Therefore, there are mainly two situations for synchronizing the W-UE with the R-UE.

In the first situation, an adjacent R-UE sends the SLSS/PSBCH, the SLSS/PSBCH may be detected by the W-UE so that the W-UE is synchronized with the R-UE and performs discovery and communication based on the timing of the corresponding SLSS. In such situation, the synchronization may be accomplished according to the existing art.

The embodiments of the present disclosure include solutions described below.

Solution 1: in the second situation, there is an R-UE nearby, but the R-UE does not actively send the SLSS/PSBCH (that is, the R-UE does not actively send the SLSS or does not actively send the SLSS and the PSBCH) and thus the W-UE may not detect the SLSS/PSBCH from the R-UE directly. The W-UE has discovery or communication requirements, actively sends the SLSS/PSBCH, and receives a discovery signal from the R-UE based on the timing of sending the SLSS/PSBCH (there is an R-UE nearby and a discovery signal is sent after detecting the synchronization signal of the W-UE, otherwise the W-UE will not receive the discovery signal). After detecting the SLSS/PSBCH sent by the W-UE, the R-UE sends a discovery signal based on a timing (timing 2) of the synchronization signal of the W-UE, where the discovery signal carries the synchronization information of the R-UE, such as an offset between the SLSS timing (timing 1) of the R-UE and the SLSS timing (timing 2) of the W-UE, and sends SLSS/PSBCH based on the R-UE's own sending timing (timing 1). The W-UE receives the discovery signal sent by the R-UE based on timing 2 and may quickly detect the SLSS/PSBCH of the R-UE based on the synchronization information carried. For example, the SLSS/PSBCH of the R-UE may be detected within a very small time window based on a time delay corresponding to the timing offset. Thus, the W-UE is synchronized with the R-UE, thereby avoiding the continuous search of the SLSS/PSBCH for a long time.

Figure 9:
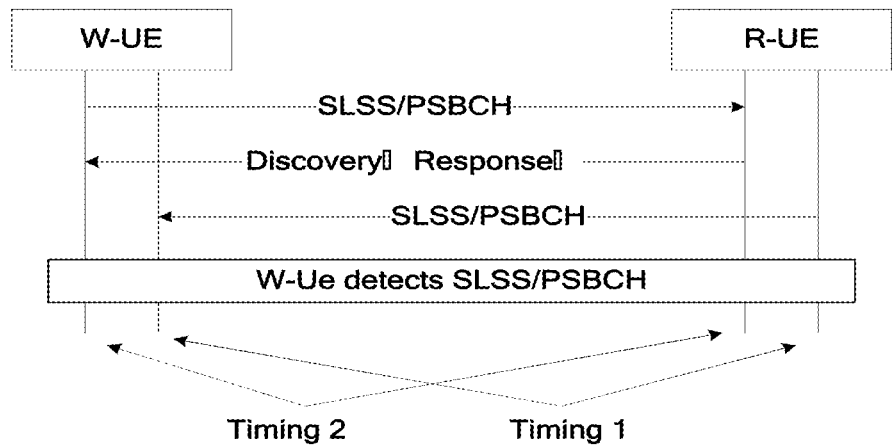
FIG. 9 is a flowchart of solution 1 provided according to an embodiment of the present disclosure.

The R-UE may send the discovery signal within a predefined time window (repeated sending may be considered) based on the timing of the SLSS/PSBCH sent by the W-UE. The frequency domain resource used for sending the discovery signal is a predefined bandwidth, such as the middle 6 physical resource block (PRB), or a frequency domain resource range for sending the discovery signal is determined according to the bandwidth indicated in the PSBCH sent by the W-UE with 6 PRBs for sending the synchronization signal as the center. If the W-UE fails to receive the discovery signal within a predefined time window, it is deemed that there is no R-UE nearby and this synchronization test is ended. The W-UE may send a SLSS/PSBCH periodically or be triggered by an event to send the SLSS/PSBCH so as to initiate the synchronization test. The W-UE stops sending the SLSS/PSBCH until the W-UE is synchronized with the R-UE. FIG. 9 is a flowchart of solution 1 provided according to an embodiment of the present disclosure.

Figure 10:
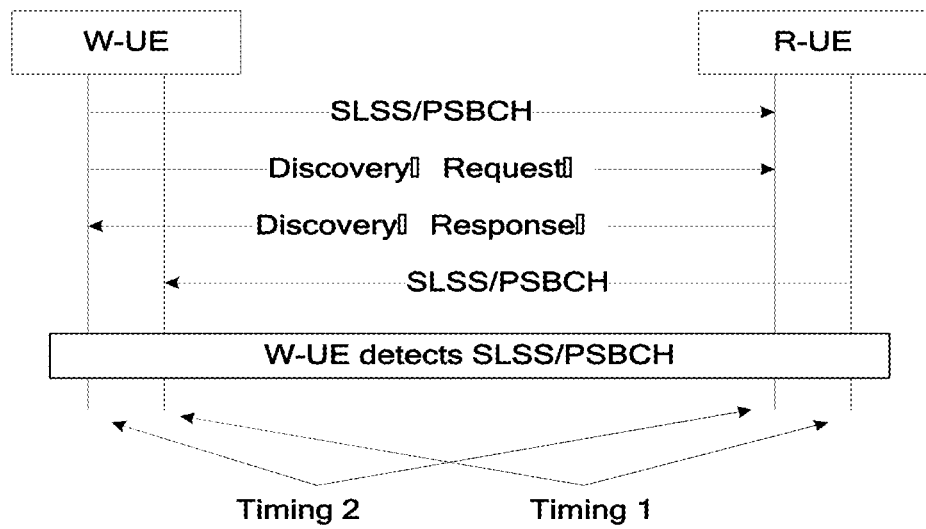
FIG. 10 is a flowchart of solution 2 provided according to an embodiment of the present disclosure.

Solution 2: FIG. 10 is a flowchart of solution 2 provided according to an embodiment of the present disclosure. As shown in FIG. 10, the W-UE simultaneously sends a SLSS/PSBCH and a discovery signal (Discovery). The Discovery is used for instructing that the W-UE has a requirement to be in synchronized with a R-UE, and indicating the time window information and/or resource position information for sending a discovery signal response by the R-UE. After detecting the SLSS/PSBCH sent by the W-UE, the R-UE receives the discovery signal sent by the W-UE based on the synchronization timing, determines that the W-UE has a need to discover the R-UE, and then sends a discovery signal (based on timing 2) as a response, where the response carries synchronization information, such as the timing offset between the W-UE and the R-UE and/or the size of the time window for searching the synchronization signal of the R-UE by the W-UE. Further, the R-UE sends SLSS/PSBCH based on the R-UE's own sending timing (timing 1). The W-UE detects the SLSS/PSBCH of the R-UE according to the synchronization information indicated by the discovery signal response received from the R-UE.

Several parallel flows are described above as a whole. The above solutions may be further described from the perspective of the W-UE and the R-UE respectively.

1. Description of the above solutions from the perspective of the W-UE (1) The W-UE sends a SLSS/PSBCH; or the W-UE sends the SLSS/PSBCH and a discovery signal;

(2) The W-UE receives a discovery signal of the R-UE based on the timing at which the W-UE sends the SLSS/PSBCH (in this case, the discovery signal of the R-UE is also sent based on the timing reference of the SLSS of the W-UE). The R-UE sends a discovery signal within a time window of a fixed time delay based on the sending timing of the W-UE. Alternatively, the R-UE determines, based on the information indicated by the discovery signal sent by the W-UE, a time delay, a time window or a radio resource for sending a discovery signal of the R-UE by itself, and sends the discovery signal within the determined time delay, the determined time window, or on the determined radio resource. The W-UE receives the discovery signal and obtains the time window information for searching the synchronization signal of the R-UE to avoid a large-scale detection and reception, which is favorable for saving the power consumption.

(3) The discovery signal sent by the R-UE carries the synchronization information of the R-UE, including information about the timing offset between the R-UE and the W-UE. For example, the timing reference for sending the SLSS/PSBCH by the W-UE is timing 2, and the timing reference of the R-UE is timing 1 (timing 1 may be aligned with a cellular DL timing). The discovery signal sent by the R-UE carries an offset and a W value. The offset is a delay of timing 1 relative to timing 2, and the W value is a value that reflects the size of the time window. The W value may also be a predefined value or may be determined according to a pre-configuration or configuration, may be used to determine the foregoing time window, for example, the first time window. The W-UE determines a time reference t by delaying based on the timing 2 with the offset, and searches for the SLSS/PSBCH within the time window of [t−W, t+W], [t, t+W] or [t−W, t].

That is, the process on the side of the W-UE includes: in step 1, the SLSS/PSBCH is sent; (Optionally, a discovery signal is sent); in step 2, a discovery signal is received within a predefined time delay or within a time delay indicated by the discovery signal of the W-UE, and synchronization signal indication information of the R-UE is obtained; in step 3, the SLSS/PSBCH of the R-UE is detected within a determined time window according to the synchronization signal indication information.

2. Description of the above solutions from the perspective of the R-UE (1) When the SLSS/PSBCH is detected (or a discovery signal sent by a W-UE is received), a discovery signal is sent within a predefined time delay, or the discovery signal is sent within a time delay or a time window or on a radio resource indicated by the discovery signal of the W-UE, the discovery signal carries the synchronization signal indication information;

(2) the SLSS/PSBCH is sent.

Figure 11:
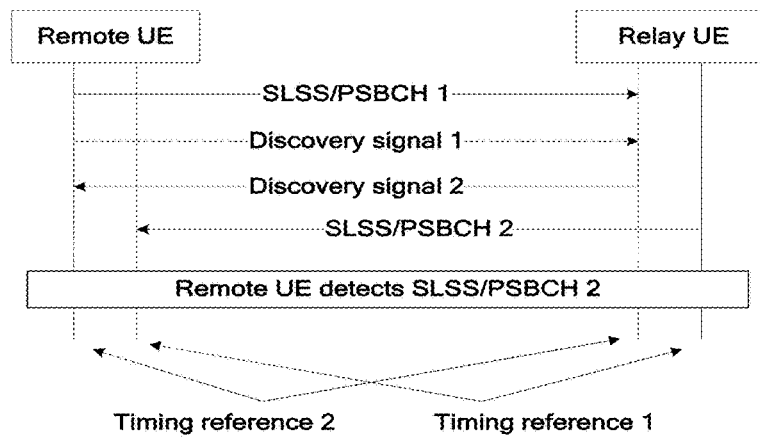
FIG. 11 is a flowchart of a method provided according to an embodiment of the present disclosure.

FIG. 11 is a flowchart of a method provided according to an embodiment of the present disclosure. As shown in FIG. 11, a process in which a Remote UE is synchronized with a Relay UE is described below.

In step 1, the Remote UE sends a SLSS/PSBCH (SLSS/PSBCH 1), that is, the Remote UE only sends the SLSS or sends both the SLSS and the PSBCH. The Remote UE sends the SLSS/PSBCH 1 based on timing reference 2 which is an internal timing reference or an exterior timing reference. The internal timing reference is a timing reference determined by the Remote UE according to a clock generated by crystal oscillator components of the Remote UE itself. The external timing reference is a timing reference obtained by the Remote UE according to the detected SLSS/PSBCH, and the Remote UE can identify that this timing reference is not the timing reference of the Relay UE, or can not receive the discovery signal from the Relay UE based on this timing reference.

In step 2, the remote UE sends a discovery signal (discovery signal 1). The remote UE sends discovery signal 1 based on the timing reference (timing reference 2) for sending the SLSS/PSBCH 1 described in step 1. This step is optional. Discovery signal 1 carries recognition information of the Remote UE or requirement information for discovering a Relay UE. Discovery signal 1 may further include time delay information, time window information, or radio resource information for instructing the Relay UE to send a discovery signal (discovery signal 2).

In step 3, the remote UE detects the discovery signal (discovery signal 2) based on timing reference 2. The discovery signal 2 to be detected is sent by the relay UE based on timing reference 2 and carries information for synchronizing the remote UE with the relay UE, such as an offset Q between the timing reference (timing reference 1) for sending a signal and/or data by the Relay UE and timing reference 2, and/or parameter w1 about a time window (also referred to as a search window). The condition for the Relay UE to send discovery signal 2 is that discovery signal 1 is detected by the Relay UE or SLSS/PSBCH 1 is detected by the Relay UE.

Figure 12:
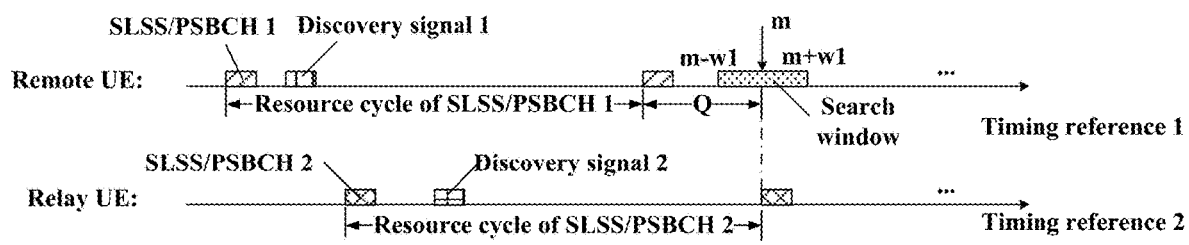
FIG. 12 is a schematic diagram of an example of determining a time window (or a search window) provided according to an embodiment of the present disclosure.

In step 4, the Remote UE detects the SLSS and/or the PSBCH (SLSS/PSBCH 2) within a specific time window (or search window). The specific search window is determined based on the information for synchronizing the Remote UE with the Relay UE obtained from discovery signal 2. For example, the Remote UE determines a reference point m by delaying for offset Q based on its synchronization resources, constructs, based on the reference point m in combination with w1, a time window [m−w1, m+w1], [m, m+i*w1] or [m−i*w1, m], where i is a positive integer, and w1 is indicated by the discovery signal sent by the Relay UE and may also be determined according to a predefinition or pre-configuration or configuration. The SLSS/PSBCH (SLSS/PSBCH 2) is detected within the time window. FIG. 12 is a schematic diagram of an example of determining a time window (or a search window) provided according to an embodiment of the present disclosure, as shown in FIG. 12.

In this embodiment, the resources for sending the SLSS/PSBCH are periodically distributed. The Remote UE sends SLSS/PSBCH 1 periodically. Alternatively, the Remote UE sends SLSS/PSBCH 1 when being triggered by an event. Conditions for triggering the Remote UE to send SLSS/PSBCH 1 include, but are not limited to the following: the Remote UE needs to send data or has a need to establish a link with a Relay UE, but is not synchronized with the Relay UE. After the Remote UE is synchronized with the Relay UE, the Remote UE stops sending SLSS/PSBCH 1 and discovery signal 1, and sends signal/data based on the timing reference of the Relay UE.

Figure 13:
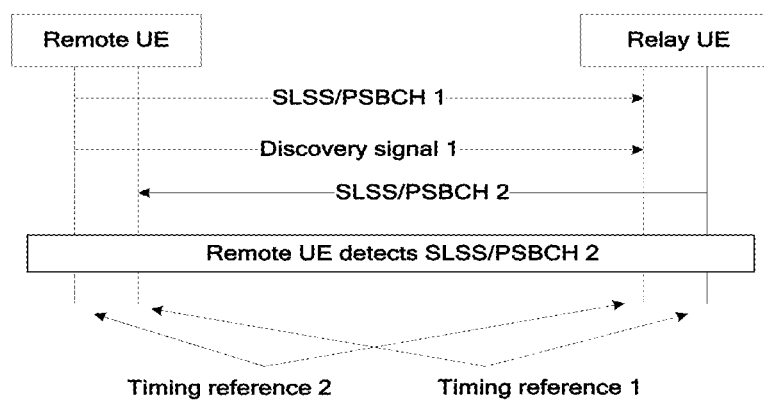
FIG. 13 is a flowchart of a method provided according to an embodiment of the present disclosure.

FIG. 13 is a flowchart of a method provided according to an embodiment of the present disclosure. As shown in FIG. 13, a process in which the Remote UE is synchronized with the Relay UE is described below.

In step 1, the remote UE sends a SLSS/PSBCH (SLSS/PSBCH 3), that is, the remote UE sends only the SLSS or sends both the SLSS and the PSBCH. The Remote UE sends SLSS/PSBCH 3 based on timing reference 2 which is an internal timing reference or an exterior timing reference.

The internal timing reference is a timing reference determined by the Remote UE according to a clock generated by crystal oscillator components of the Remote UE itself. The external timing reference is a timing reference obtained by the Remote UE according to the detected SLSS/PSBCH, and the Remote UE may identify that this timing reference is not from the timing reference of the Relay UE, or may not receive the discovery signal from the Relay UE based on this timing reference.

In step 2, the remote UE detects the discovery signal (discovery signal 3) based on timing reference 2. The discovery signal 3 to be detected is sent by the relay UE based on timing reference 2 and carries information for synchronizing the remote UE with the relay UE, such as an offset Q between a timing reference (timing reference 1) for sending a signal and/or data by the Relay UE and timing reference 2, and/or parameter w1 about a time window (also referred to as a search window). In addition, the parameter w1 may also be determined according to a pre-definition or pre-configuration or configuration. The condition for the Relay UE to send discovery signal 3 is that SLSS/PSBCH 3 is detected by the Relay UE.

In step 3, the Remote UE detects the SLSS/PSBCH (SLSS/PSBCH 4) within a specific time window (or search window). The specific search window is determined based on the information for synchronizing the Remote UE with the Relay UE obtained from discovery signal 3. For example, the Remote UE determines a reference point m by delaying for offset Q based on its synchronization resources, constructs, based on the reference point m in combination with w1, a time window [m−w1, m+w1], [m, m+i*w1] or [m−i*w1, m], where i is a positive integer, and w1 is indicated by the discovery signal sent by the Relay UE and may also be determined according to a predefinition or pre-configuration or configuration. The SLSS/PSBCH (SLSS/PSBCH 4) is detected within the time window. The determination of the specific time window (or search window) may be referred to FIG. 12.

In this embodiment, the resources for sending the SLSS/PSBCH are periodically distributed. The Remote UE sends SLSS/PSBCH 3 periodically. Alternatively, the Remote UE sends SLSS/PSBCH 3 when being triggered by an event. Conditions for triggering the Remote UE to send SLSS/PSBCH 3 include, but are not limited to the following: the Remote UE needs to send data or has a need to establish a link with a Relay UE, but is not synchronized with the Relay UE. After the Remote UE is synchronized with the Relay UE, the Remote UE stops sending SLSS/PSBCH 3, and sends signal/data based on the timing reference of the Relay UE.

If the Relay UE detects a SLSS/PSBCH (SLSS/PSBCH 5), that is, the Relay UE detects only the SLSS or detects both the SLSS and the PSBCH, and the timing reference (timing reference 2) of SLSS/PSBCH 5 is different from the timing reference (timing reference 1) of the Relay UE for sending a signal and/or data, or the Relay UE may identify that SLSS/PSBCH 5 is sent by the Remote UE, then the Relay UE sends a discovery signal (discovery signal 4) based on timing reference 2.

Alternatively, if the relay UE receives a discovery signal (discovery signal 5), and the timing reference (timing reference 2) of discovery signal 5 is different from the timing reference (timing reference 1) of the relay UE for sending a signal and/or data, or it is determined that discovery signal 5 is sent by the Remote UE according to the recognition information carried in discovery signal 5, then the Relay UE sends the discovery signal (discovery signal 4) based on timing reference 2.

The Relay UE sends discovery signal 4 within a determined time delay or time window, which is predefined, or is determined according to a configuration or pre-configuration, or is determined according to indication information of discovery signal 5.

If there is a conflict between sending discovery signal 4 by the Relay UE and other signals and/or data sent based on timing reference 1, the sending of discovery signal 4 is abandoned. Discovery signal 4 carries information for synchronizing the Remote UE with the Relay UE, such as an offset Q between a timing reference (timing reference 1) of the Relay UE for sending a signal and/or data and timing reference 2, and/or parameter w1 about the search window.

The Relay UE sends SLSS/PSBCH 6 based on timing reference 1.

If the Relay UE detects a SLSS/PSBCH (SLSS/PSBCH 7), that is, the relay UE detects only the SLSS or detects both the SLSS and the PSBCH, and the timing reference (timing reference 2) of SLSS/PSBCH 7 is different form the timing reference (timing reference 1) of the Relay UE for sending a signal and/or data, or the Relay UE may identify that SLSS/PSBCH 7 is sent by the Remote UE, then the Relay UE sends a SLSS/PSBCH (SLSS/PSBCH 8) based on timing reference 1.

Alternatively, if the relay UE receives a discovery signal (discovery signal 6), and the timing reference (timing reference 2) of the discovery signal is different from the timing reference (timing reference 1) of the relay UE for sending a signal and/or data, or it is determined that discovery signal 6 is sent by the Remote UE according to the recognition information carried in discovery signal 6, then the Relay UE sends a SLSS/PSBCH (SLSS/PSBCH 8) based on timing reference 1.

The Remote UE sends the SLSS/PSBCH, or also sends the discovery signal; the discovery signal is used to indicate that the Remote UE needs to be in synchronized with the R-UE, and has the time window information and/or resource position information of the R-UE for sending the discovery signal response.

The Remote UE receives the discovery signal within a pre-defined or configured or pre-configured or indicated time window, and detects the SLSS/PSBCH sent by the Relay UE within the determined time window according to indication content of the discovery signal.

The Relay UE detects the SLSS/PSBCH sent by the Remote UE, or receives the discovery signal of the Remote UE, and sends a discovery signal response within the determined time window according to a pre-definition or configuration or pre-configuration, where the discovery signal response carries the indication information of the SLSS/PSBCH.

Apparently, those skilled in the art should understand that the above-mentioned modules or steps of the present disclosure may be implemented by a general-purpose computing apparatus, and the above-mentioned modules or steps may be concentrated on a single computing apparatus or distributed on a network composed of multiple computing apparatuses, optionally, the above-mentioned modules or steps may be implemented with a program code executable by a computing apparatus, such that they may be stored in a storage device and executed by the computing apparatus, and in some cases, the steps shown or described may be performed in an order different from that of here, or they are separately made into individual integrated circuit modules, or multiple modules or steps in them are made into a single integrated circuit module for implementation. As such, the present disclosure is not limited to any particular combination of hardware and software.

The above descriptions are merely preferred embodiments of the present disclosure and are not intended to limit the present disclosure. For those skilled in the art, the present disclosure may have various modifications and changes. Any modification, equivalent replacement, or improvement made within the principle of the present disclosure shall be included in the protection scope of the present disclosure.

INDUSTRIAL APPLICABILITY

In the technical solution disclosed in the embodiment of the present disclosure, the remote user equipment sends a first synchronization signal based on a first timing reference, detects a first discovery signal based on the first timing reference, where the first discovery signal carries synchronization information, and detects a second synchronization signal within a first time window based on the synchronization information. In this way, instead of being detected at any time or at the start of the D2D discovery, the second synchronization signal may be detected only within the first time window, thereby shortening the detection time of the second synchronization signal, reducing the power consumption for detecting the second synchronization signal and having a positive industrial effect. In addition, the method provided by the embodiment of the present disclosure has the characteristics of simple and convenient implementation, and may be widely promoted in industry.

What is claimed is:

1. A signal detection method, applied to a first user equipment and comprises:

sending, based on a first timing reference, a first synchronization signal to a second user equipment, wherein the first synchronization signal is used for the second user equipment to obtain the first timing reference and send a first discovery signal based on the first timing reference;

detecting, based on the first timing reference, the first discovery signal sent by the second user equipment; wherein the first discovery signal carries synchronization information; and after the first discovery signal is detected, detecting, within a first time window corresponding to the synchronization information, a second synchronization signal sent by the second user equipment;

wherein the synchronization information comprises an offset between the first timing reference and a second timing reference, or the synchronization information comprises an offset between the first timing reference and a second timing reference as well as a parameter of the first time window; wherein the second timing reference is a timing reference based on which the second user equipment sends the second synchronization signal;

wherein in a case where the synchronization information comprises the offset between the first timing reference and the second timing reference, detecting, within the first time window corresponding to the synchronization information, the second synchronization signal sent by the second user equipment comprises: determining, based on the first timing reference and according to the synchronization information and a parameter of the first time window, the first time window; and detecting, within the determined first time window, the second synchronization signal sent by the second user equipment; and in a case where the synchronization information comprises the offset between the first timing reference and the second timing reference as well as the parameter of the first time window, detecting, within the first time window corresponding to the synchronization information, the second synchronization signal sent by the second user equipment comprises: determining, based on the first timing reference and according to the synchronization information, the first time window; and detecting, within the determined first time window, the second synchronization signal sent by the second user equipment.

2. The method of claim 1, wherein the first synchronization signal comprises at least one of a first sidelink synchronization signal (SLSS) or a first physical sidelink broadcast channel (PSBCH); and the second synchronization signal comprises at least one of a second SLSS or a second PSBCH.

3. The method of claim 1, wherein before detecting, based on the first timing reference, the first discovery signal sent by the second user equipment, the method further comprises:

sending a second discovery signal to the second user equipment based on the first timing reference, wherein the second discovery signal carries at least one of the following information: recognition information of the first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

4. The method of claim 3, wherein detecting, based on the first timing reference, the first discovery signal sent by the second user equipment comprises at least one of:
   in a case where the second discovery signal carries the time delay information for sending the first discovery signal by the second user equipment, detecting, based on the first timing reference and within a time delay corresponding to the time delay information carried by the second discovery signal, the first discovery signal sent by the second user equipment;
   in a case where the second discovery signal carries the time window information for sending the first discovery signal by the second user equipment, detecting, based on the first timing reference and within a time window corresponding to the time window information carried by the second discovery signal, the first discovery signal sent by the second user equipment; or
   in a case where the second discovery signal carries the resource position information for sending the first discovery signal by the second user equipment, detecting, based on the first timing reference and on a resource position corresponding to the resource position information carried by the second discovery signal, the first discovery signal sent by the second user equipment.

5. A signal sending method, applied to a second user equipment and comprises:
   detecting a first synchronization signal sent by a first equipment;
   sending a first discovery signal to the first equipment based on a first timing reference, wherein the first timing reference is a timing reference obtained by detecting the first synchronization signal; the first discovery signal carries synchronization information, wherein the synchronization information is used by the first user equipment to determine a first time window used for detecting a second synchronization signal; and
   sending the second synchronization signal to the first equipment based on a second timing reference;
   wherein the synchronization information comprises an offset between the first timing reference and the second timing reference, or the synchronization information comprises an offset between the first timing reference and the second timing reference as well as a parameter of the first time window.

6. The method of claim 5, wherein the first synchronization signal comprises at least one of a first sidelink synchronization signal (SLSS) or a first physical sidelink broadcast channel (PSBCH); and the second synchronization signal comprises at least one of a second SLSS or a second PSBCH.

7. The method of claim 5, wherein after detecting the first synchronization signal sent by the first equipment, the method further comprises:
   receiving, based on the first timing reference, a second discovery signal sent by the first equipment, wherein the second discovery signal carries at least one of the following information: recognition information of the first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

8. The method of claim 7, wherein in a case where the second discovery signal carries the recognition information of the first user equipment, after receiving the second discovery signal, the method further comprises:
   determining, according to the recognition information, that the first user equipment is a remote user equipment having a requirement to discover the relay user equipment.

9. The method of claim 7, wherein in a case where the second discovery signal carries at least one of the time delay information, the time window information, or the resource information, after receiving the second discovery signal, the method further comprises at least one of:
   determining a time delay for sending the first discovery signal according to the time delay information, and sending the first discovery signal within the determined time delay;
   determining a time window for sending the first discovery signal according to the time window information, and sending the first discovery signal within the determined time window for sending the first discovery signal; or
   determining a resource for sending the first discovery signal according to the resource information, and sending the first discovery signal on the determined resource.

10. A signal detection apparatus, located in a first user equipment and comprises a processor and a storage device for storing computer executable instructions that when executed by the processor cause the processor to:
    send, based on a first timing reference, a first synchronization signal to a second user equipment, wherein the first synchronization signal is used for the second user equipment to obtain the first timing reference and send a first discovery signal based on the first timing reference;
    detect, based on the first timing reference, the first discovery signal sent by the second user equipment; wherein the first discovery signal carries synchronization information; and
    after the first discovery signal is detected, detect, within a first time window corresponding to the synchronization information, a second synchronization signal sent by the second user equipment;
    wherein the synchronization information comprises an offset between the first timing reference and a second timing reference, or the synchronization information comprises an offset between the first timing reference and a second timing reference as well as a parameter of the first time window; wherein the second timing reference is a timing reference based on which the second user equipment sends the second synchronization signal;
    wherein in a case where the synchronization information comprises the offset between the first timing reference and the second timing reference, detecting, within the first time window corresponding to the synchronization information, the second synchronization signal sent by the second user equipment comprises: determining, based on the first timing reference and according to the synchronization information and a parameter of the first time window, the first time window; and detecting, within the determined first time window, the second synchronization signal sent by the second user equipment; and
    in a case where the synchronization information comprises the offset between the first timing reference and the second timing reference as well as the parameter of the first time window, detecting, within the first time window corresponding to the synchronization information, the second synchronization signal sent by the second user equipment comprises: determining, based on the first timing reference and according to the synchronization information, the first time window; and detecting, within the determined first time window, the second synchronization signal sent by the second user equipment.

11. The apparatus of claim 10, wherein the first synchronization signal comprises at least one of a first sidelink synchronization signal (SLSS) or a first physical sidelink broadcast channel (PSBCH); and the second synchronization signal comprises at least one of a second SLSS or a second PSBCH.

12. The apparatus of claim 10, wherein the processor is further configured to:
send a second discovery signal to the second user equipment based on the first timing reference, wherein the second discovery signal carries at least one of the following information: recognition information of the first user equipment for instructing that the first user equipment has a requirement to discover a relay user equipment, time delay information for sending the first discovery signal by the second user equipment, time window information for sending the first discovery signal by the second user equipment, or resource position information for sending the first discovery signal by the second user equipment.

13. A signal sending apparatus, comprising a processor and a storage device for storing computer executable instructions that when executed by the processor cause the processor to perform the followings to implement the method according to claim 3:
detecting a first synchronization signal sent by a first equipment;
sending a first discovery signal to the first equipment based on a first timing reference, wherein the first timing reference is a timing reference obtained by detecting the first synchronization signal, the first discovery signal carries synchronization information, wherein the synchronization information is used by the first user equipment to determine a first time window used for detecting a second synchronization signal; and
sending the second synchronization signal to the first equipment based on a second timing reference;
wherein the synchronization information comprises an offset between the first timing reference and the second timing reference, or the synchronization information comprises an offset between the first timing reference and the second timing reference as well as a parameter of the first time window.

14. The apparatus of claim 13, wherein the first synchronization signal comprises at least one of a first sidelink synchronization signal (SLSS) or a first physical sidelink broadcast channel (PSBCH); and the second synchronization signal comprises at least one of a second SLSS or a second PSBCH.

15. The apparatus of claim 13, wherein the processor is further configured to:
receive, based on the first timing reference, a second discovery signal sent by the first equipment, wherein the second discovery signal carries at least one of the following information: recognition information of the first user equipment for instructing that the first user equipment has a requirement to discover a relay user equipment, time delay information for sending the first discovery signal by a second user equipment, time window information for sending the first discovery signal by the second user equipment, or resource position information for sending the first discovery signal by the second user equipment.

* * * * *